H. J. GIBNEY & J. A. WOLFE.
PIPE RIG COUPLING.
APPLICATION FILED JUNE 24, 1911.

1,035,697.

Patented Aug. 13, 1912.

Witnesses

Inventors,
Harry J. Gibney and
John A. Wolfe,
By
Attorney.

UNITED STATES PATENT OFFICE.

HARRY J. GIBNEY AND JOHN A. WOLFE, OF TULSA, OKLAHOMA.

PIPE-RIG COUPLING.

1,035,697.  Specification of Letters Patent.  Patented Aug. 13, 1912.

Application filed June 24, 1911. Serial No. 635,228.

*To all whom it may concern:*

Be it known that we, HARRY J. GIBNEY and JOHN A. WOLFE, citizens of the United States, residing at Tulsa, in the county of Tulsa, State of Oklahoma, have invented a new and useful Pipe-Rig Coupling, of which the following is a specification.

Our invention relates to improvements in pipe rig couplings for the legs, braces and girts of pipe derricks, in which the steel bowl or sleeve of the coupling is reinforced by a solid steel pin or shaft, less in diameter than the opening of the bowl, said pin being cast as part of the coupling and extending lengthwise beyond the bowl several inches; and the objects of our improvements are, first, to secure firmness, strength and stability in a pipe derrick structure by the insertion of the solid steel pins of the coupling several inches into the pipe legs of the derrick and the resting of the ends of the pipe legs in the bowl of the coupling, thus holding the structure firmly in place by its own weight; second, to hold the pipe structure more firmly in place by the use of a bolt hole in the side of the bowl of the coupling at its center through which bolts are run to bolt the braces and girts thereto.

We attain these objects by the device illustrated in the accompanying drawing in which—

Figure 1:
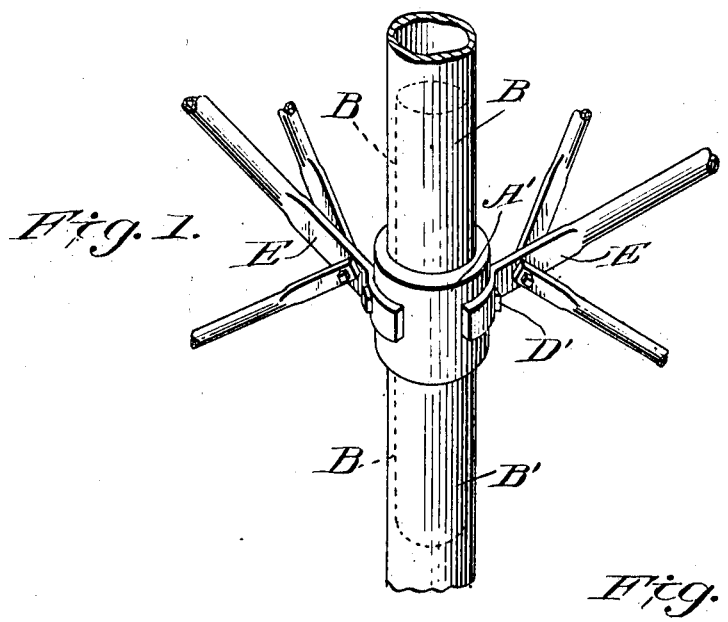
Figure 2:
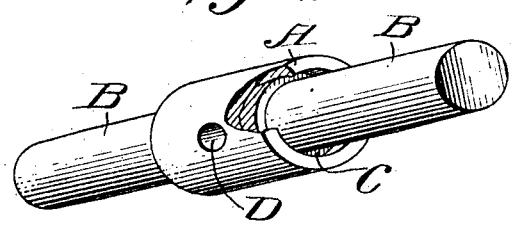
Figure 3:
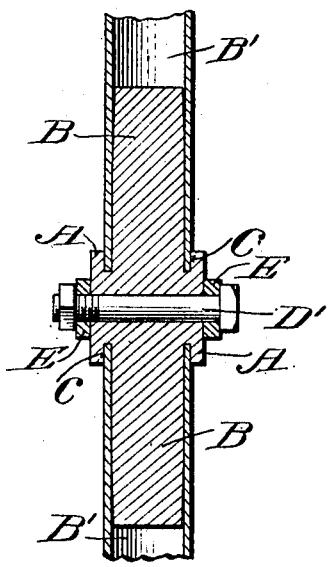
Figure 4:

Figure 1 is a perspective view of the coupling as it appears with portions of a tubular derrick leg, or pipe-rig structure, connected thereby, showing the ends of the girts of said structure connected thereto; Fig. 2 a perspective view of the coupling by itself, a portion of one side of the central part being broken away to illustrate the annular seat or recess, for the end of pipe section, more clearly; Fig. 3 a central longitudinal section as through Fig. 1 on a line intersecting the bolt for the attachment of the girts E thereto; and Fig. 4 an end elevation of the coupling separately.

Similar letters refer to similar parts throughout the several views.

"A" is the bowl or sleeve of the coupling with which the shaft or pin "B" is cast and of which it is a part; "C" are the seats of the bowl in which the pipe legs such as B' rest on either side; "D" is the bolt hole passing through the bowl from side to side and D' are the bolts by means of which the girts and braces of the derrick are bolted on to the coupling. In using the coupling, which may be of varying sizes according to the size of pipe used, in the course of rigging up or constructing a pipe derrick, the pipe legs are placed in the seats "C" of the bowl, the lower pin of the coupling extending downward into the lower pipe leg, and the upper pin of the coupling extending upward into the upper pipe leg. The pin of the coupling should be of the same diameter as the opening of the pipe leg, thereby making a close fit and making it necessary for the pin to be driven into the end of the pipe leg. The weight of the pipe legs resting upon the several couplings thus reinforced by the solid steel pin or shaft cast with it, produces firmness and strength in the structure. The braces and girts of the derrick are bolted to the couplings by means of bolts E extending through the hole "D".

The solid steel pin cast with the bowl of the coupling constitutes the essence of the improvement, for thereby, as explained above, the joints are held firmly in place and the jumping, bowing, buckling and twisting of the derrick resulting from heavy strain during operation is thereby prevented or minimized by the reinforcement resulting from the presence of the pin. The simplicity of this coupling with the easy method of incorporating it in the structure of the pipe derrick is vastly superior to all other so called couplings or sleeves, not only in stability but as a labor saving device. Should the bowl of the coupling become broken or chipped the pins extending into the legs of the derrick will in themselves prevent the legs from collapsing or telescoping, thus wrecking the derrick, as is now the tendency in the case of all other so called couplings or sleeves in use.

We are aware that prior to our invention, pipe rig couplings or sleeves have been made and used, we therefore do not claim such appliance broadly, but,

We claim:

1. In a coupling device for the joints of derricks and similar pipe-rig structures, an integral coupling member having two oppositely projecting solid cylindrical pins operable to fit tightly the respective bores of two tubular sections to be connected, the central body portion of said member being of a larger diameter than the pipe sections and formed with an annular recess on each end surrounding the bases of the projecting pins and operable to engage the ends of the tubular sections to be connected, said central body portion being solid having a perforation extending therethrough transversely and adapted to receive a bolt to attach other parts of the structure thereto, substantially as described.

2. In a coupling device for derricks and similar pipe-rig structures, a coupling member having a central body portion with solid pins integral therewith and projecting each way therefrom for a considerable distance, each of said pins being adapted to fit closely the bore of a structure section, said central body portion having a transverse bolt hole extending therethrough and said central portion having an annular recess formed around the base of each of said pins, said recesses being operable to receive and clamp the ends of the structure sections, said coupling member being adapted to be disposed vertically and to be maintained in engagement with the structure sections by the weight of said member and said sections, substantially as described.

HARRY J. GIBNEY.
JOHN A. WOLFE.

Witnesses:
ROGER S. SHERMAN,
MARK D. SIPEN.